US010291544B1

(12) United States Patent
Guerin et al.

(10) Patent No.: US 10,291,544 B1
(45) Date of Patent: May 14, 2019

(54) BANDWIDTH SAVING WITH PROGRAMMABLE REDISTRIBUTION

(71) Applicant: Harmonic, Inc., San Jose, CA (US)

(72) Inventors: Benoit Guerin, Rennes (FR); Frederic Pasquier, Betton (FR); Xavier Besnard, Acigne (FR)

(73) Assignee: Harmonic, Inc., San Jose, CA (US)

( * ) Notice: Subject to any disclaimer, the term of this patent is extended or adjusted under 35 U.S.C. 154(b) by 231 days.

(21) Appl. No.: 15/214,318

(22) Filed: Jul. 19, 2016

(51) Int. Cl.
*G06F 15/173* (2006.01)
*H04L 12/927* (2013.01)
*H04L 29/06* (2006.01)

(52) U.S. Cl.
CPC ............ *H04L 47/80* (2013.01); *H04L 65/601* (2013.01); *H04L 65/607* (2013.01)

(58) Field of Classification Search
CPC ........... H04N 21/2402; H04N 21/2385; H04N 21/2662; H04N 21/23406; H04N 21/2365; H04N 21/64738; H04L 47/80; H04L 65/601; H04L 65/607
USPC ....................................................... 709/226
See application file for complete search history.

(56) References Cited

U.S. PATENT DOCUMENTS

| | | | | |
|---|---|---|---|---|
| 4,959,862 A * | 9/1990 | Davidov | ................... | H04N 7/16 348/E7.054 |
| 6,453,471 B1 * | 9/2002 | Klosterman | ....... | H04N 5/44543 348/563 |
| 8,213,309 B2 * | 7/2012 | Kliger | ................. | H04L 12/2861 370/230 |
| 8,397,269 B2 * | 3/2013 | Barrett | ................. | H04N 5/4401 725/120 |
| 8,856,797 B1 * | 10/2014 | Siddiqui | .................... | G06F 9/46 718/104 |
| 8,989,281 B2 * | 3/2015 | Sullivan | ........... | H04N 21/64322 375/240.26 |
| 9,106,787 B1 * | 8/2015 | Holmer | ................... | H04L 43/087 |
| 9,338,068 B2 * | 5/2016 | Patel | ..................... | H04L 41/147 |
| 9,350,616 B1 * | 5/2016 | Lou | ...................... | H04L 41/0896 |
| 9,438,487 B2 * | 9/2016 | Phillips | ................... | H04L 47/26 |
| 9,578,355 B2 * | 2/2017 | Hardin | .................... | H04L 47/15 |
| 9,602,414 B2 * | 3/2017 | Floyd | .................... | H04L 47/22 |
| 9,699,230 B2 * | 7/2017 | Alam | .................. | H04L 65/4084 |
| 2008/0273591 A1 * | 11/2008 | Brooks | ................ | H04N 7/1675 375/240.01 |
| 2012/0004960 A1 * | 1/2012 | Ma | ..................... | G06Q 30/0241 705/14.4 |
| 2014/0006822 A1 * | 1/2014 | Diab | ..................... | G06F 1/3206 713/322 |

* cited by examiner

*Primary Examiner* — Phuoc H Nguyen
(74) *Attorney, Agent, or Firm* — Brokaw Patent Law PC; Christopher J. Brokaw (57) ABSTRACT

A video encoder unit receives a video signal to encode along with auxiliary services such as audio streams and/or data streams. While the auxiliary streams are allotted a fixed bandwidth, the video encoder determines a required video bandwidth, which must be allocated in response to the request by a central allocator. Where economies are made in the auxiliary services for example by transmitting stereo audio instead of surround sound for example, the bandwidth requested from the central allocator is inflated by an amount corresponding to a proportion of the economized bandwidth. The extra bandwidth allocated on this basis may then be used for improving the quality of video encoding, and/or reserved for the transmission of asynchronous data.

18 Claims, 8 Drawing Sheets

FIG. 1

PRIOR ART

FIG. 2

PRIOR ART

BANDWIDTH SAVING WITH PROGRAMMABLE REDISTRIBUTION

FIELD OF THE INVENTION

Embodiments of the invention relate to the distribution of video content over a delivery network.

BACKGROUND

The consumption of video content is dramatically increasing due, at least in part, to availability of VOD (Video on Demand) services, the increasing number of live services, and the proliferation of devices on which video may be accessed. Video content can be accessed by many different types of devices, such as smart phones, tablets, personal computers, televisions, and game consoles, which are connected to various types of networks including broadcast, satellite, cellular, ADSL, and fibre.

Due to the large size of raw video when stored in digital form, digital video content is generally accessed in a compressed format. Consequently, video content is generally expressed in, and associated with, a particular video compression standard.

Figure 1:
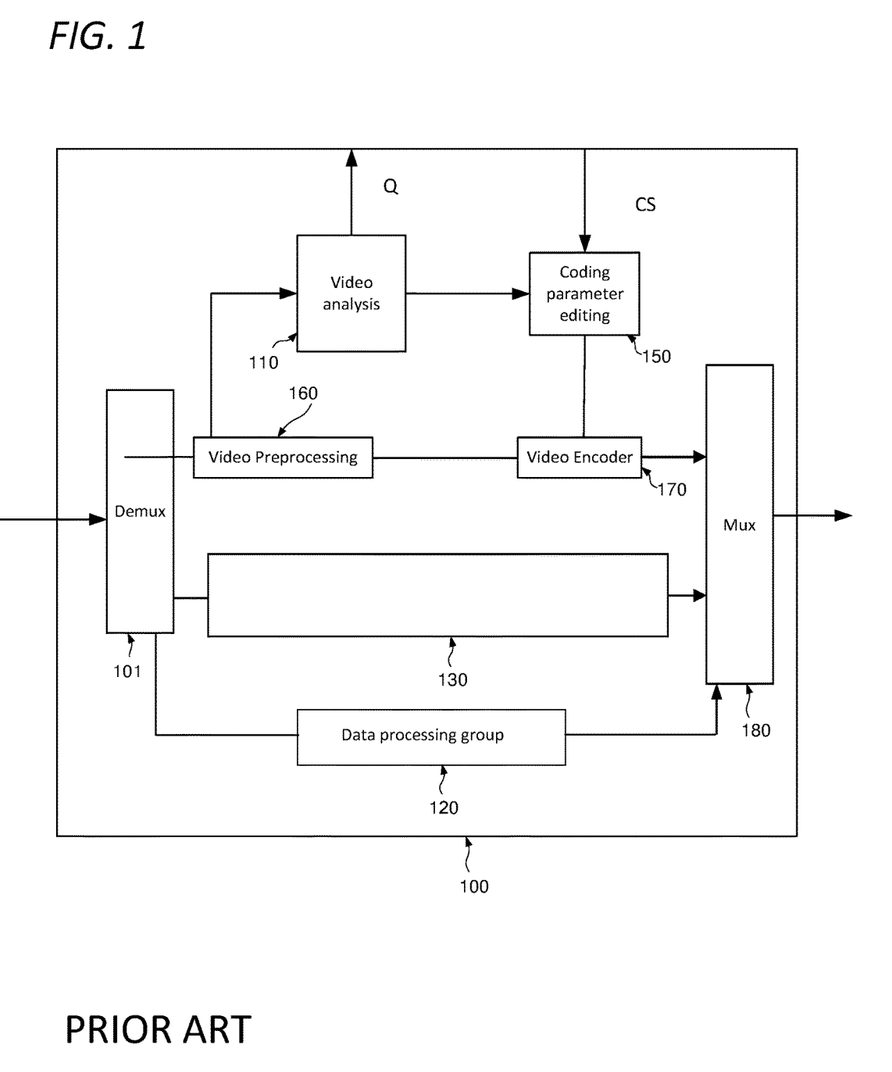
FIG. 1 is an illustration of a prior art channel encoder.

FIG. 1 is an illustration of a prior art channel encoder. The structure of FIG. 1 is based on that described in European Patent Application Publication Number EP 0915623, filed on Oct. 23, 1998, entitled "Device for Processing Coded Video Data and Systems for Distributing Programmes Using Such a Device," which is hereby incorporated by reference for all purposes as if fully set forth herein. As shown in FIG. 1, the channel encoder 100 receives a stream comprising a video stream, one or more accompanying audio streams, and one or more accompanying data streams. A number of audio streams which may correspond to the sound track of the video content in different languages or different audio encoding standards may be included within the received stream. Similarly, data streams relaying subtitles, Teletext, Interactive applications, tickers, and the like may be provided in respective data streams.

The video streams, audio streams, and one or more accompanying data streams comprised within the received stream are separated by a demultiplexer 101. As shown, the encoded video stream is sent to a video analysis module 110, each audio stream is sent to a respective audio encoder belonging to an audio processing group 130, and each data stream is sent to a respective data encoder belonging to a data processing group (not shown in FIG. 1). The stream of data which enters the device 100 may comprise a compressed data source such as, for example, a compressed archived data source (not shown) or an uncompressed video source with audio and data embedded in the Vertical or Horizontal Ancillary transport.

The input stream may be a compressed stream consisting of data representing a video programme in a Single Programme Transport Stream (SPTS), Multiple Program Transport Stream (MPTS), a broadcast transponder, Serial Digital Interface (SDI) base band video with Audio/data transport in VANC/HANC emanating from a Video production studio source, and so on. The input stream therefore consists of a succession of packets of video data, of packets of audio data, and of packets of data relating to at least one program consisting of video and audio data.

The input stream may be an uncompressed stream comprising video data, and ancillary data in horizontal and vertical blanking areas of the HD-SDI signal. In an uncompressed input stream the ancillary data may transport audio and auxiliary data. As such, it may therefore consist of a succession of video data lines, horizontal blanking lines mainly transporting auxiliary data and vertical blanking lines mainly transporting audio samples.

The compressed or uncompressed input stream is applied to the demultiplexer 101 whose function is to separate the packets or lines of video data from the remainder of the packets or lines of data contained in the stream. Thus, the packets of video data are extracted from a first output of the demultiplexer 101 while the packets of non-video data are extracted from a second output of the demultiplexer 101.

The packets of video data are recognized by means of the Packet Identifier (PID), and forwarded to the video preprocessing component 160. The uncompressed video stream is then forwarded to a video analysis unit 110 adapted to retrieve, in clear, values of coding parameters from coded video data, to a coding parameter editing unit 150 adapted to support modification of at least one coding parameter value on the basis of a bit rate instruction CS and to an encoder 170 for coding video data.

The coded video data which enters the channel encoder 100 may constitute a constant bit-rate stream of data VD1 emanating, for example, from an archived source or, more generally, from a source emanating from a compression step, which is not represented in FIG. 1. The video data is forwarded to video preprocessing component 160 and to the analysis unit 110. Video preprocessing component 160 decodes the video data and forwards the decoded video data to the encoding unit 170. The video analysis unit 110 generates, from the coded video data and uncompressed (decoded) video data, a signal Q consisting of data representing the values of the various coding parameters originally used to code the video data. The signal Q is applied to the coding parameter editing unit 150. The video analysis unit 110 may, as shown, forward the value Q to a decision facility (not shown). This decision facility additionally receives signals of the same kind as the signal Q originating from other devices.

Figure 2:
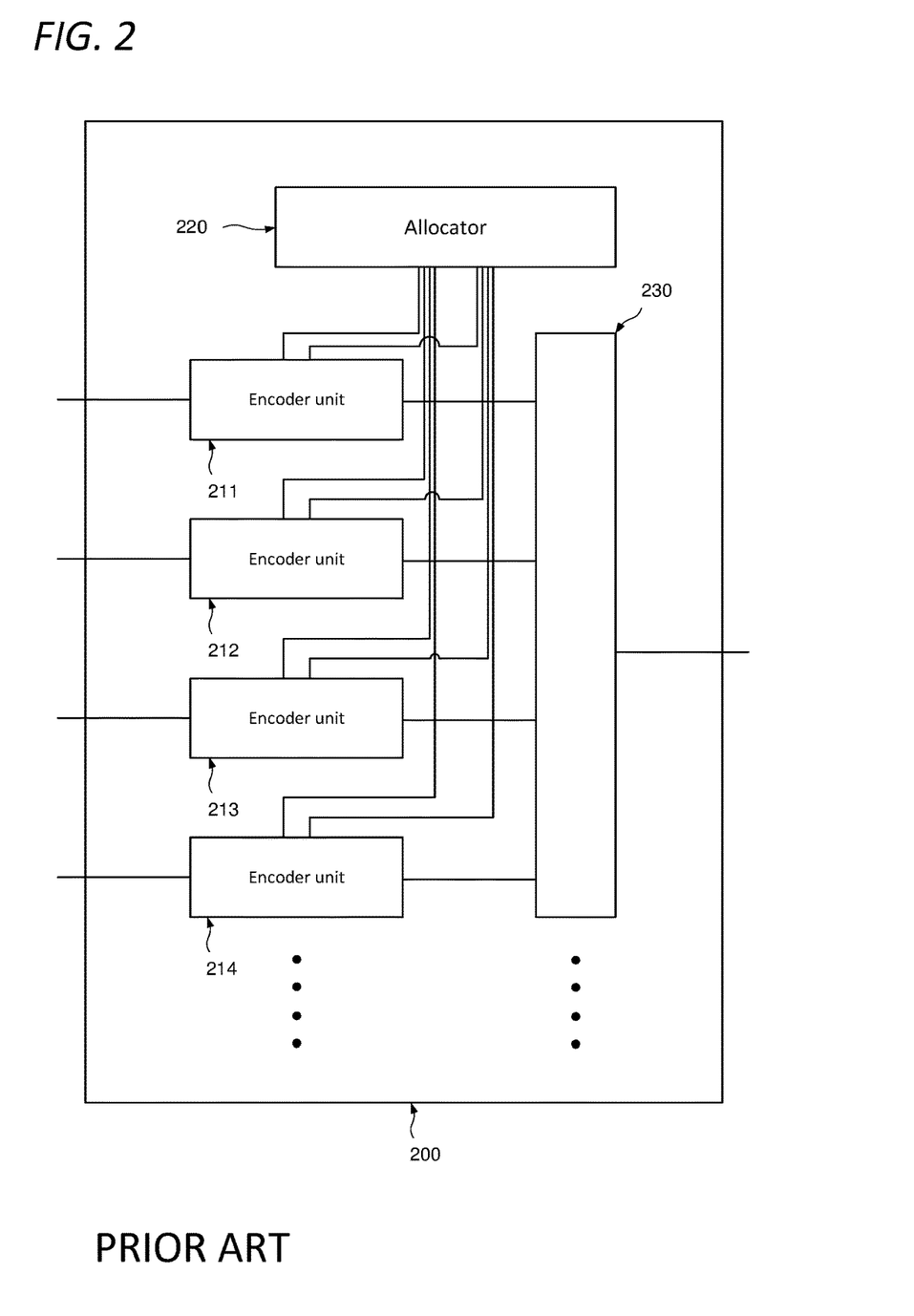
FIG. 2 is an illustration of a video distribution system incorporating one or more video encoders units as described with reference to FIG. 1.

FIG. 2 is an illustration of a video distribution system incorporating one or more video encoder units as described with reference to FIG. 1. As shown in FIG. 1, the system comprises a plurality of channel encoder units 211, 212, 213, 214, each of which may correspond to the channel encoder unit 100 as described with reference to FIG. 1. As such, each channel encoder unit outputs a respective Q signal, and receives a respective CS instruction. Each Q signal is conveyed to an allocator 220, which in turn determines and outputs the CS instruction to each encoder unit. As such, the encoder unit may manage the bandwidth attributed to each encoder, and the corresponding video stream that encoder handles, in an optimized manner. The outputs of each channel encoder are multiplexed together by multiplexer 230 for transmission.

Under the action of the bit rate instruction CS, the coding parameter editing unit 150 modifies the value of a coding parameter, such as the value of the coding parameter relating to the quantizing of the coefficients emanating from the DCT. The coding parameter editing unit 150 generates a new set of values of coding parameters, which the encoder 170 then applies to encode the video data so as to constitute an output video stream whose bit rate is different from the bit rate of the input video stream. Between the demultiplexer 101 and the multiplexer 180, the non-video data are delayed by the circuit 130. The function of the delay circuit 130 is to delay the non-video data by the duration of the processing of the video data. A stream of video and non-video data is reconstructed at the output of the multiplexer 180.

In video statistical multiplexing, a set of video components share a video pool bit rate. A bit rate is allocated to each video service according to the complexity of the incoming pictures. A low bit rate is assigned to a low complexity video service while a high bit rate is assigned to a high complexity video service. By this means, all video services produce constant video quality streams.

A static bit rate is reserved for audio and data. This reserved bit rate is maximized in order to support the maximum bit rate of each component. The reserved bit rate is not always fully used.

While the above described mechanism allows for a dynamic handling of video encoding, it takes no account of variations in transmission demands for non-video data. It is desirable to improve bandwidth management in a manner taking account of these factors.

BRIEF DESCRIPTION OF THE DRAWINGS

The above and other advantages of the present invention will now be described with reference to the accompanying drawings, in which.

DETAILED DESCRIPTION OF THE INVENTION

Approaches for processing video data are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

An embodiment of the invention enables a bandwidth request unit for a digital television head end encoder unit where bandwidth is allocated to the encoder on the basis of a dynamic attribution for video data and a predetermined value for auxiliary data. The encoder may comprise a video encoder, a video analysis unit, and one or more auxiliary encoders. The video analysis unit may receive the video data to be encoded by the video encoder. The video analysis unit may determine a required video bandwidth corresponding to the received video data using predetermined encoding parameters. Each auxiliary encoder may receive respective auxiliary data, encode respective auxiliary data, and output a corresponding auxiliary bandwidth requirement to the bandwidth request unit. The bandwidth request unit may determine the difference between the predetermined bandwidth allocation for the auxiliary data and the sum of the auxiliary bandwidth requirements output by each auxiliary encoder, and subsequently, output an encoder bandwidth request corresponding to the required video bandwidth plus the predetermined bandwidth allocation for the auxiliary data less a first predetermined proportion of the difference. A video bandwidth request is emitted for each picture.

By requesting more bandwidth than is strictly required, the encoder is able to reserve a portion of economised bandwidth for other purposes. Since the mechanism is built on the modification of requests compiled at a head end encoder, it is compatible with, and transparent to, existing head end equipment.

The auxiliary encoders of a bandwidth request unit of an embodiment may process audio channel streams or data channel streams.

The bandwidth request unit of an embodiment may provide encoding instructions to the video encoder such that the bandwidth of the encoded video signal output by the encoder is greater than the required video bandwidth by an amount equal to a second predetermined proportion of the difference, where the second predetermined proportion is less than or equal to the difference less the first predetermined proportion of the difference. Accordingly, the encoder is able to convert economies in bandwidth used for the video program auxiliary services into improvements in video quality of the encoded video program.

According to another embodiment of the invention, a digital television headend encoder unit comprises a bandwidth request unit as described herein and a multiplexer configured to multiplex the respective outputs of the digital television headend encoder units into a single encoder unit output stream.

The digital television headend encoder unit may be adapted to add asynchronous data to the encoder unit output stream, wherein the bandwidth of the asynchronous data is controlled so as to not exceed the difference between the remainder of the difference less the first predetermined proportion and the second predetermined proportion. Accordingly, the encoder is able to ensure that economies in bandwidth used for auxiliary services are not converted entirely into improved video for the local channel, or other channels, but that some bandwidth remains available for the transmission of asynchronous data.

In an embodiment of the invention, a digital television headend comprises one or more digital television headend encoder units as described herein and a multiplexer configured to multiplex the respective outputs of the digital television headend encoder units into a single headend output stream. The digital television headend may also comprise an allocator that receives respective encoder bandwidth requests from the respective bandwidth request units of each digital television headend encoder unit. The allocator may assign bandwidth to each of the digital television headend encoder units on the basis of such requests.

Embodiments of the invention involve approaches for processing video data that involve receiving video data, determining a required bandwidth for transmitting the video data with predetermined encoding parameters, receiving an auxiliary input stream comprising auxiliary data associated with the video data, determining a required bandwidth for transmitting the auxiliary data with predetermined encoding parameters, determining a difference between a predetermined bandwidth allocation for transmission of auxiliary data and the required bandwidth for transmitting the auxiliary data, and requesting the required video bandwidth plus the predetermined bandwidth allocation for the auxiliary data minus a first predetermined proportion of the difference value.

By requesting more bandwidth than is strictly required, the encoder is able to reserve a portion of economised bandwidth for other purposes, such as for video program video quality enhancements or for unallocated null packets (spare bandwidth) that could be necessary for other asynchronous data insertion in the multiplex. Since the mechanism is built on the modification of requests compiled at a head end encoder, it is compatible with, and transparent to existing head end equipment. The auxiliary input stream may comprise an audio stream or a data stream.

In an embodiment, the video signal may be encoded such that the bandwidth of the encoded video signal is greater that the required video bandwidth by an amount equal to a second predetermined proportion of the difference where the second predetermined proportion is less than or equal to the remainder of the difference less the first predetermined proportion. Accordingly, economies in bandwidth used for auxiliary services can be converted into improvements in video quality of the encoded video program. The encoded video stream and the encoded auxiliary stream may be multiplexed into a single output stream.

In an embodiment, asynchronous data may be added to the output stream. The bandwidth of the asynchronous data is controlled so as to not exceed the remainder of the difference less the first predetermined proportion and the second predetermined. Accordingly, economies in bandwidth used for auxiliary services are not converted entirely into improved video for the local channel, or other channels, but it is ensured that some bandwidth remains available for the transmission of asynchronous data.

Processing Video Data

When the channel encoder of the prior art depicted by FIG. 1 emits coding parameter Q, and receives coding instruction CS, this is carried out solely on the basis of the characteristics of the video signal. Both the channel encoder 100 and attributor 211 of FIG. 2 proceed on the assumption that the non-video stream or streams (referred to hereafter as auxiliary streams) are of constant bandwidth. In reality, however, such auxiliary streams are likely to vary over time. Further, auxiliary streams are potential targets for deliberate suppression, for example by switching from 5.1 surround sound audio to stereo audio or dropping a data service. The systems depicted in FIGS. 1 and 2 lack the means to allow the channel owner to benefit from any such variation.

Figure 3:
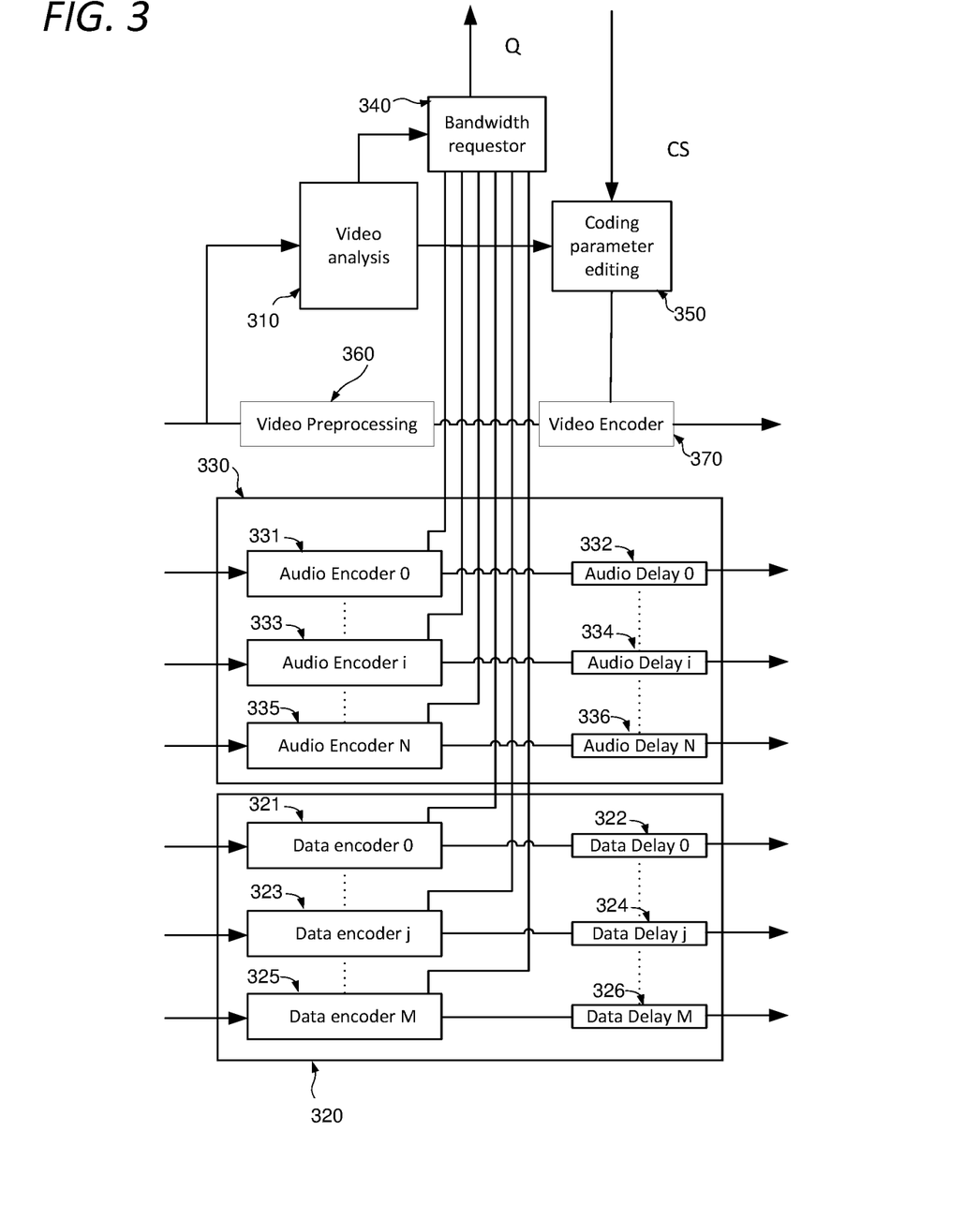
FIG. 3 is an illustration of elements of a channel encoder according to an embodiment of the invention.

FIG. 3 shows elements of a channel encoder of an embodiment of the invention. As shown in FIG. 3, the channel encoder receives a video stream, and one or more accompanying audio streams, and/or one or more auxiliary streams. These video and non-video streams may be multiplexed together, and separated by a demultiplexer (not shown). The auxiliary stream may typically comprise a number of audio streams corresponding to the soundtrack of the video content in different languages and/or different audio encoding standards. Similarly, data streams relaying subtitles, Teletext, Interactive applications, tickers and the like may be provided in respective data streams.

As shown in FIG. 3, the encoded video stream is sent to a video analysis module 310, each audio stream is sent to a respective audio encoder 331, 333, 335 belonging to an audio processing group 330, and each data stream is sent to a respective data encoder 321, 323, 325 belonging to a data processing group 320. These data encoder and audio encoders together constitute auxiliary encoders to the video encoder 370 and the audio and data streams constitute auxiliary services to the video stream.

The video analysis module 310, each audio encoder 331, 333, 335 and each data encoder 321, 323, 325 is adapted to determine the required bandwidth for the transmission of its respective stream once encoded in accordance with current encoding parameters, and to submit this information to bandwidth requestor 340. Bandwidth requestor 340 also receives information from the video analysis unit 310.

The coding parameter editing module 350 receives a coding instruction CS and provides an edited coding parameter to the video encoder 370. Video encoder 370 also receives the decoded video stream output from video pre-processing unit 360. Video encoder 370 may implement or comprise: horizontal and vertical filtering, a circuit for rearranging the video data, a motion estimator, a coding decision block, a circuit for carrying out the operation commonly referred to as a discrete cosine transform and denoted DCT, a circuit for quantizing the coefficients emanating from the DCT, or a variable-length coder and a buffer memory, or any combination of these.

Bandwidth is allocated to the channel encoder of an embodiment (such as that depicted in FIG. 3) on the basis of a dynamic attribution for video data, as represented by the coding instruction CS, and a fixed value for auxiliary services.

In operation, video analysis unit 310 determines a required video bandwidth corresponding to the received video data using a predetermined encoding configuration, and each auxiliary encoder is connected to receive a respective digital input stream, and adapted to encode the respective digital input stream, and output a corresponding auxiliary bandwidth requirement to the bandwidth request unit. Bandwidth requestor 340 is further adapted to determine the difference between a fixed bandwidth allocation for the auxiliary services and the sum of the auxiliary bandwidth requirements output by each auxiliary encoder, and to output an encoder bandwidth request corresponding to the required video bandwidth plus the fixed bandwidth allocation for the auxiliary services less a first predetermined proportion of the difference.

Thus, bandwidth requestor 340 does not merely request the amount of bandwidth required for the transmission of the video stream, but rather requests an amount of bandwidth reflecting the entire predicted transmission, including auxiliary services.

It will be appreciated that the functions of the different functional units described with respect to FIG. 3 may be distributed in a large number of alternative configurations without departing from the invention. For example, the functions of video analysis and video pre-processing may be combined, the functions of encoding and delaying the auxiliary streams may be combined, the delay functions may be omitted, and timing information edited by the video or auxiliary encoders. The video stream may arrive un-encoded, in which case the video analysis unit 310 may be simplified and the video pre-processing unit 360 adapted accordingly.

Figure 4:
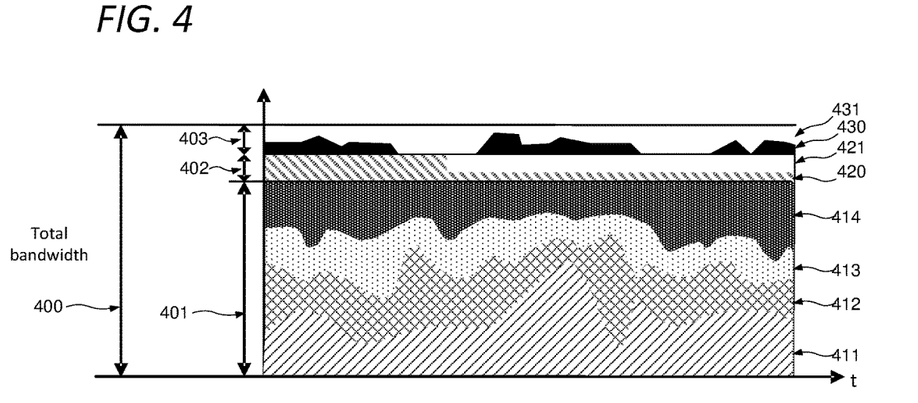
FIG. 4 is an illustration of an exemplary input data scenario according to an embodiment of the invention.

FIG. 4 is an illustration of an exemplary input data scenario according to an embodiment of the invention. As shown in FIG. 4, the bandwidth requirements of four video streams 411, 412, 413 and 414 are plotted over time. The bandwidth requirements of four video streams 411, 412, 413 and 414 are plotted cumulatively so that it can be seen that at any time the aggregate of the total bandwidth of the four streams 411, 412, 413 and 414 equals a constant video bandwidth value 401. This may reflect the operation of the allocator 220, which issues encoding instructions to each channel encoder 211, 212, 213, 214 to ensure that at any time the aggregate of the four video streams 411, 412, 413 and 414 is equal to the entire video bandwidth 401, which is presumed to be fixed. Adding the video bandwidth and the auxiliary bandwidths 402 and 403 results in the total transmission bandwidth 400.

Meanwhile, audio bit rate 430 and data bit rate 420 are shown as varying over time. These curves represent the total bandwidth requirement associated with the four video streams 411, 412, 413 and 414. Although the bandwidth allocated to digital data 402 and to audio data 403, which together constitute auxiliary bandwidth, are also fixed, the actual bandwidth of data transmitted varies considerably. As a result, at any given time a certain portion of the allotted auxiliary bandwidth may be unused. Specifically, as shown in FIG. 4, the unused digital data bandwidth is represented by the un-shaded region 421 and the unused audio data bandwidth 431 is represented by the un-shaded region 431. This unused auxiliary data bandwidth represents a wasted resource which may be redistributed in accordance with embodiments of the invention in various manners.

Figure 5:
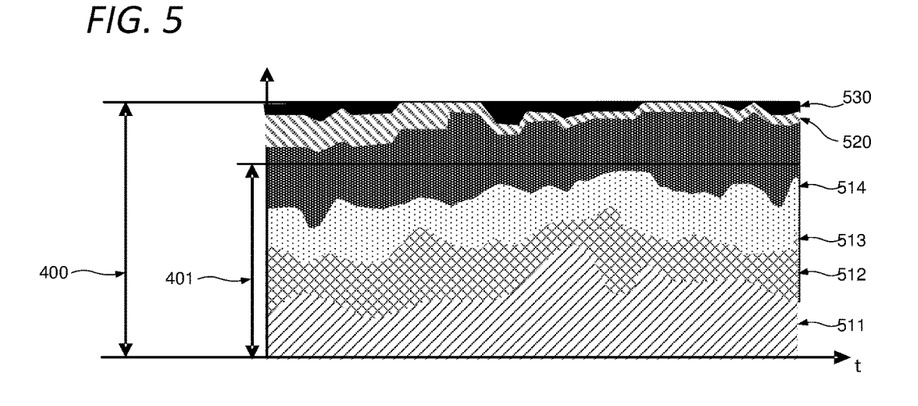
FIG. 5 is an illustration of a first bandwidth redistribution scenario corresponding to the input data of FIG. 4 according to an embodiment of the invention.

FIG. 5 shows a first bandwidth redistribution scenario corresponding to the input data of FIG. 4 in accordance with an embodiment of the invention. In the embodiment shown in FIG. 5, any bandwidth not required for transmission of auxiliary data is entirely redistributed to the four video streams, now labelled as 511, 512, 513, and 514 in FIG. 5 for clarity. The redistribution is carried out equally, and referred to as a 'community redistribution policy.' As shown in FIG. 5, the data input received is identical to that of FIG. 4; however, by operation of an embodiment the data is re-encoded so as to make optimal use of the bandwidth.

As shown in FIG. 5, the bandwidth requirements of four video streams 511, 512, 513 and 514, as well as audio bit rate 530 and data bit rate 520, are shown as varying over time and plotted cumulatively, so that it can be seen that at any time the total bandwidth of the four video streams 511, 512, 513 and 514 plus the auxiliary services 530, 520 is equal to a constant transmission bandwidth value 400, but that the instantaneous sum of the bandwidth of the four video streams 511, 512, 513, 514 at certain times exceeds the video bandwidth 401. Meanwhile, the auxiliary data 531, 521 transmitted is unchanged, but the unused bandwidth previously reserved for these channels has disappeared, having been reassigned dynamically to the video streams.

Figure 6:
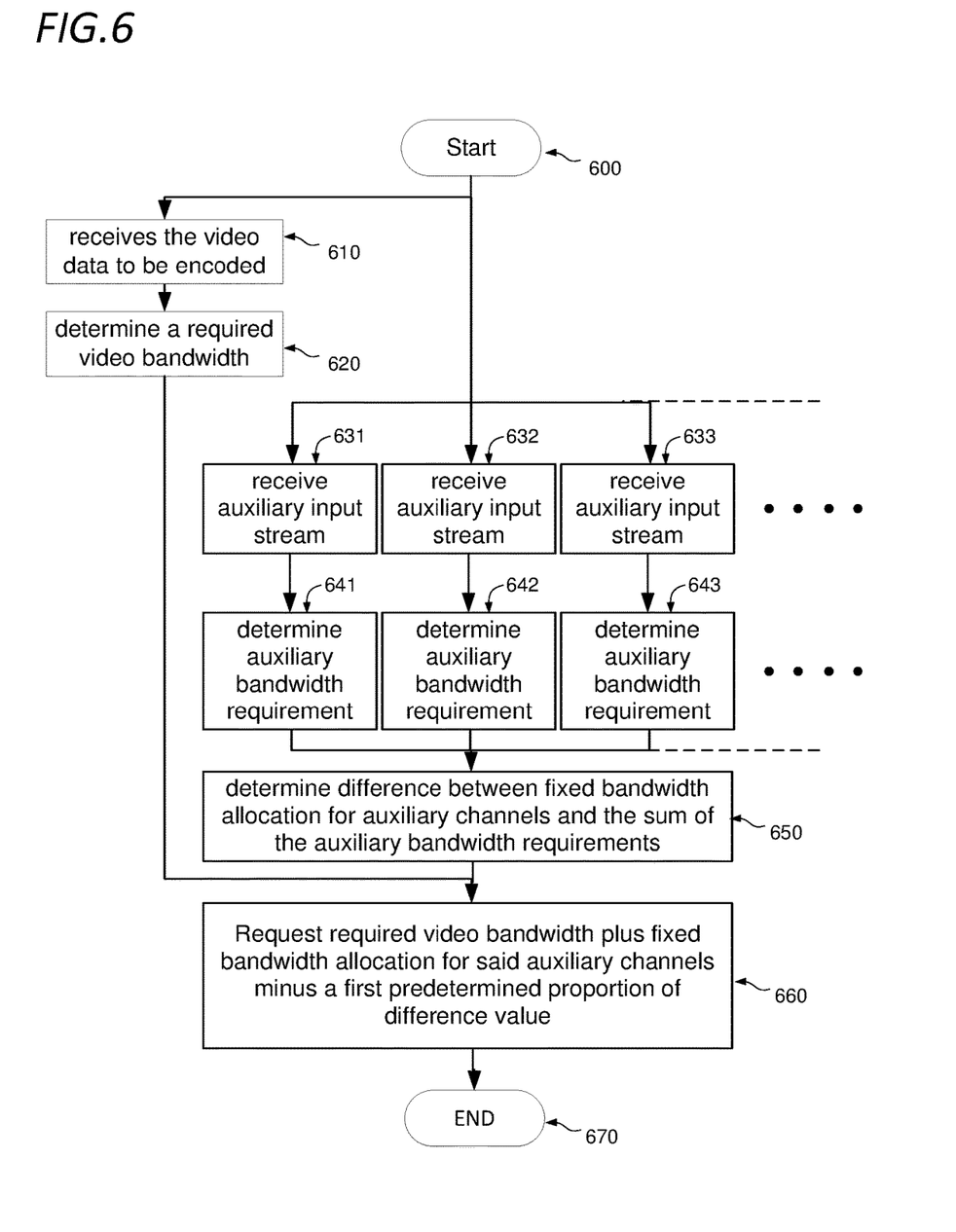
FIG. 6 is a flowchart depicting the steps of processing video data according to an embodiment of the invention.

FIG. 6 is a flowchart depicting the steps of processing video data according to an embodiment of the invention. As shown in FIG. 6, the process starts at step 600 before proceeding to receive the video data to be encoded at step 610. The process then proceeds to step 620 at which the required video bandwidth is determined, before proceeding to step 660.

Meanwhile, in parallel with steps 610 and 620, an auxiliary input stream is received at step 631, and the corresponding bandwidth requirement determined at step 641. Further auxiliary input streams are processed in parallel at steps 632 and 633 which proceed to steps 642 and 643 respectively. Any number of further auxiliary input streams (not shown) may additionally be processed in parallel with steps 632 and 642, 633, and 643.

After the steps of determining the auxiliary bandwidth requirement (steps 641, 642, 643), the process proceeds to step 650, at which the difference Δ between the fixed bandwidth allocation for the auxiliary services and the sum of the auxiliary bandwidth requirements is determined. The process then proceeds to step 660 at which a bandwidth request for bandwidth equal to the video bandwidth determined at step 620 plus the fixed bandwidth allocation for the auxiliary services minus a first predetermined proportion β of the difference value.

As such there is provided a process of processing video data comprising the steps of receiving video data, determining a required bandwidth for transmitting the video data with predetermined encoding parameters, receiving an auxiliary input stream comprising auxiliary data associated with the video data, determining a required bandwidth for transmitting the auxiliary data with predetermined encoding parameters, determining a difference Δ between a predetermined bandwidth allocation for transmission of auxiliary data and the required bandwidth for transmitting the auxiliary data, and requesting the required video bandwidth plus the predetermined bandwidth allocation for the auxiliary data minus a first predetermined proportion β of the difference value.

The process of FIG. 6 may be implemented by a structure as described with reference to FIG. 3. For example, in the context of FIG. 3, the video analysis module 310 receives the video data to be encoded at step 610 and determines the required video bandwidth at step 620. The bandwidth requestor 340 receives the required video bandwidth, and a value indicating the auxiliary bandwidth requirement each respective auxiliary service as determined by the respective encoders 331, 333, 335, 321, 323, 325 at steps 641, 642, 642, and so on. The bandwidth requestor 340 then determines the difference between the fixed bandwidth allocation for the auxiliary services and the sum of the auxiliary bandwidth requirements output by each auxiliary encoder at step 650 and determines a bandwidth request specifying a requested bandwidth allocation equal to the required video bandwidth plus the fixed bandwidth allocation for the auxiliary services minus a first predetermined proportion β of the difference at step 660.

In an instance where redistribution is carried out equally, the predetermined proportion β will be one, i.e. the requested bandwidth will be exactly what is actually produced. The economized bandwidth Δ will equally serve for all the video programs of the multiplex.

It may be desirable for some part of any savings in auxiliary service bandwidth to be reserved for the channel with respect to which they are achieved. For example, it may occur that the streams 411, 412, 413, 414 are associated with different business entities; in such an implementation, when economies in auxiliary bandwidth consumption are achieved in the channels they control, any recovered bandwidth should primarily be reassigned to that channel.

As such, the predetermined proportion β may be assigned any value less than one to achieve this end. For example, if the predetermined proportion β is 50%, then the bandwidth request will request bandwidth equal to the video bandwidth determined at step 620 plus the fixed bandwidth allocation for the auxiliary services minus half the difference value. Thus, the requested bandwidth will be the amount required for transmission at current conditions, plus an additional margin equal to half of the saved bandwidth in this particular example.

If the predetermined proportion $\beta$ is set to zero, then the bandwidth request will request bandwidth equal to the video bandwidth determined at step 620 plus the fixed bandwidth allocation for the auxiliary services minus nothing. In other words, the request will be for the entire default allocation, disregarding the economies achieved in auxiliary service bandwidth. As such, the whole of the economised bandwidth is reserved for use by the channel in which it was saved.

It will be appreciated that any arbitrary value between zero and one inclusive may be set for the predetermined proportion $\beta$. In an implementation having a plurality of similar channel encoders, such as those described with respect to FIG. 2, each channel may be assigned an individual predetermined proportion $\beta$, which may vary from one channel encoder to the next.

In cases where the predetermined proportion $\beta$ is less than one, i.e. where at least some of the economised bandwidth is retained, additional steps may be envisaged with regard to the use made of the reserved bandwidth.

For example, encoding instructions, such as lower DCT quantization levels or zone of interest preservation algorithms, may be provided to the video encoder such that the bandwidth of the encoded video signal output by the encoder is greater than the required video bandwidth by an amount equal to a second predetermined proportion $\alpha$ of the difference, where the second predetermined proportion is less than or equal to the difference minus the first predetermined proportion $\beta$.

Accordingly, the process of FIG. 6 may comprise the additional step of encoding the video signal such that the bandwidth of the encoded video signal is greater than the required video bandwidth by an amount equal to the remainder of the difference minus the first predetermined proportion, where the second predetermined proportion is less than or equal to the first predetermined proportion. Furthermore, the process may comprise the further step of adding asynchronous data to the output stream, wherein the bandwidth of the asynchronous data is controlled so as to not exceed the remainder of the difference minus the first predetermined proportion and the second predetermined proportion.

Figure 7:
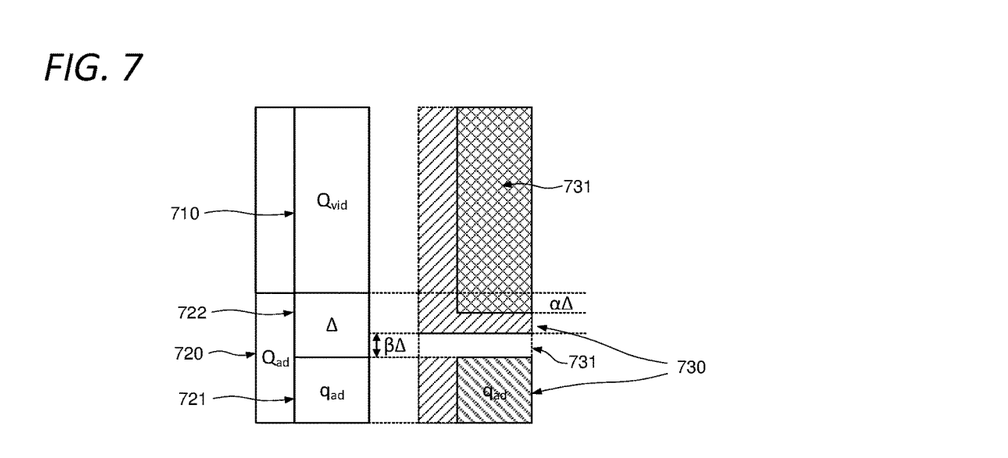
FIG. 7 is an illustration of the reutilisation of a proportion of recovered bandwidth according to an embodiment of the invention.

FIG. 7 is an illustration of the reutilisation of a proportion of recovered bandwidth according to an embodiment of the invention. As shown in FIG. 7, the video bandwidth $Q_{vid}$ determined by analysis of the received video input is represented by the height of the block 710, and the fixed bandwidth allocation $Q_{ad}$ is represented by the height of the block 720. The sum of the auxiliary bandwidth requirements $q_{ad}$ is represented by the height of the block 721. The difference $\Delta$ between the fixed bandwidth allocation $Q_{ad}$ for the auxiliary services and the sum of the auxiliary bandwidth requirements $q_{ad}$ is represented by the height of the block 722.

The encoder bandwidth request 730 shown with hashed shading corresponds to the required video bandwidth $Q_{vid}$ plus the fixed bandwidth allocation for the auxiliary services $Q_{ad}$ minus a first predetermined proportion $\beta$ of the difference $\Delta$. That is to say, encoder bandwidth request=$Q_{vid}$+ $(Q_{ad}-(\beta\Delta))$.

Furthermore, as shown in FIG. 7, encoding instructions are provided to the video encoder such that the bandwidth of the encoded video signal output by the encoder is greater that the required video bandwidth by an amount equal to a second predetermined proportion $\alpha$ of the difference $\Delta$, where the second predetermined proportion $\alpha$ is less than or equal to the difference minus the first predetermined proportion $\beta$, i.e. $\alpha \leq 1-\beta$. Thus, the bandwidth used for video encoding is $Q_{vid}+(\alpha\Delta)$. In this way, the final output video signal can be of a higher quality that that originally possible based on the video requirement $Q_{vid}$.

If the first predetermined proportion $\beta$ and second predetermined proportion $\alpha$ add up to 1, then all of the reserved bandwidth is reassigned to video encoding. If the first predetermined proportion is 1, then all of the reserved bandwidth is equally (community) redistributed.

Alternatively, the second predetermined proportion $\alpha$ may be less than the remaining $(1-\beta)$ of the first predetermined proportion, in which case a portion 731 of the reserved band width is not reassigned. In some cases, this may be desirable as a means to leaving a certain amount of "slack" in the system, which is then available for the transmission of non-synchronous data such as electronic program guides and the like. As such, the bandwidth of such asynchronous data may be controlled so as to not exceed the remainder of the difference minus the first predetermined proportion and the second predetermined proportion.

Figure 8:
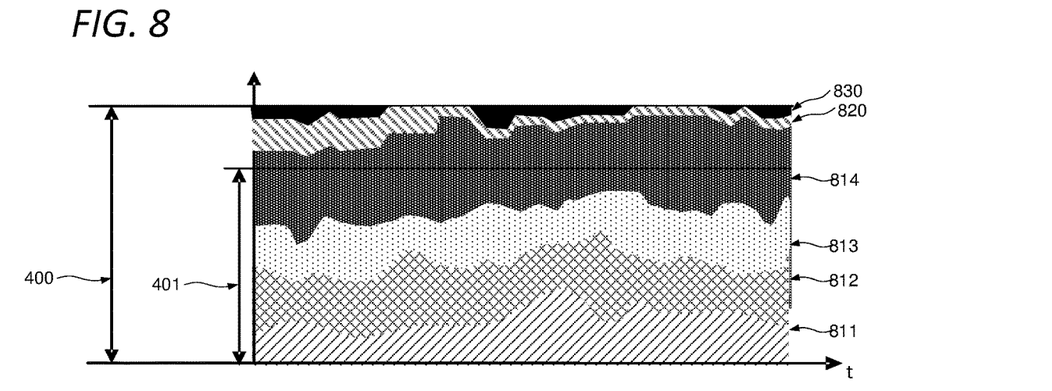
FIG. 8 is an illustration of a second bandwidth redistribution scenario corresponding to the input data of FIG. 4 according to an embodiment of the invention.

FIG. 8 is an illustration of a second bandwidth redistribution scenario corresponding to the input data of FIG. 4 according to an embodiment of the invention. As shown in FIG. 8, the data input received is identical to that of FIG. 4; however, by operation of an embodiment the data is re-encoded so as to make optimal use of the bandwidth. Thus, as shown in FIG. 8, the bandwidth requirements of four video streams 811, 812, 813 and 814, as well as audio bit rate 830 and data bit rate 820 are shown as varying over time and plotted cumulatively, so that it can be seen that at any time the total bandwidth of the four video streams plus the auxiliary services 830, 820 adds up to a constant transmission bandwidth value 400, but that the instantaneous sum of the bandwidth of the four video channels 811, 812, 813, 814 at certain times exceeds the video bandwidth 401. Meanwhile, the auxiliary data 831, 821 transmitted is unchanged, but the unused bandwidth previously reserved for these channels has disappeared, having been reassigned dynamically to the video streams.

For the sake of this example it is presumed that the channels 811, 812, 813 are returning any spare bandwidth for redistribution in the same way as described with reference to FIG. 5. In this example, meanwhile the encoder for stream 814 has been configured to request bandwidth corresponding to its full allocation, and then internally reallocate spare bandwidth to video encoding. In other words, the encoder for stream 814 requests $Q_{vid}+(Q_{ad}-((\beta)\Delta))$, with $\beta$ being equal to one, and furthermore internally allocates $Q_{vid}+(\alpha\Delta)$ for video encoding, with a also being equal to $1-\beta=0$. Accordingly, as shown, whilst the channels 811, 812, 813 occupy the same bandwidth as in FIG. 5, the bandwidth for stream 814 is visibly broader.

Figure 9:
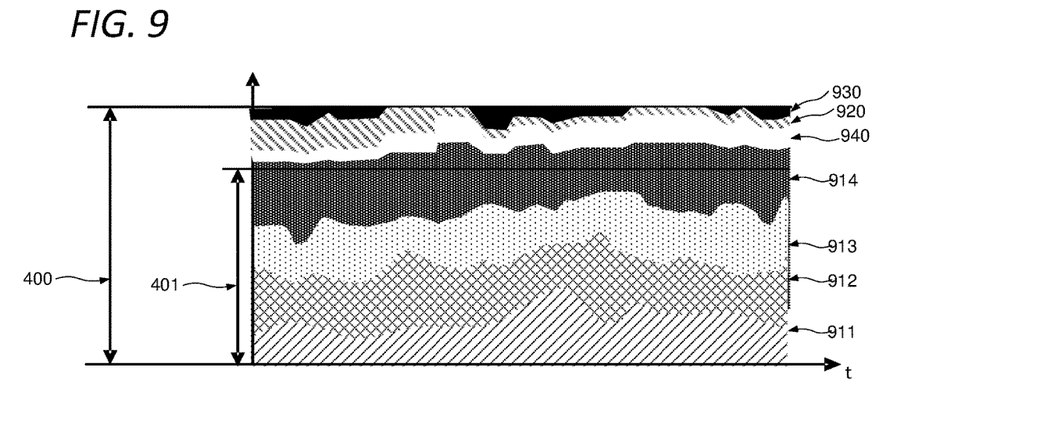
FIG. 9 is an illustration of a second bandwidth redistribution scenario corresponding to the input data of FIG. 4 according to an embodiment of the invention.

FIG. 9 is an illustration of a second bandwidth redistribution scenario corresponding to the input data of FIG. 4 according to an embodiment of the invention. As shown in FIG. 9, the data input received is identical to that of FIG. 4; however, by operation of an embodiment the data is re-encoded so as to make optimal use of the bandwidth. Thus, as shown in FIG. 9, the bandwidth requirements of four video streams 911, 912, 913 and 914, as well as audio bit rate 930 and data bit rate 920 are shown as varying over time and plotted cumulatively, so that it can be seen that at any time the total bandwidth of the four video streams plus the auxiliary services 930, 920 adds up to a constant transmission bandwidth value 400, but that the instantaneous sum of the bandwidth of the four video streams 911, 912, 913, 914 at certain times exceeds the video bandwidth 401. Meanwhile, the auxiliary data 930, 920 transmitted is unchanged.

For the sake of the example of FIG. 9, it is presumed that the streams 911, 912, 913 are returning any spare bandwidth for redistribution in the same way as described with reference to FIG. 5. In the example of FIG. 9, meanwhile the encoder for stream 914 has been configured to request bandwidth corresponding to its full allocation, and then internally reallocate half of the spare bandwidth to video encoding, and reserve the other half for other functions such as the transmission of asynchronous data. In other words, the encoder for stream 914 requests $Q_{vid}+(Q_{ad}-(\beta\Delta))$, with $\beta$ being equal to zero, and furthermore internally allocates $Q_{id}+(\alpha\Delta)$ for video encoding, with a being equal to one half. Accordingly, as shown in FIG. 9, whilst the streams 911, 912, 913 occupy the same bandwidth as in FIG. 5, the bandwidth for stream 914 is visibly broader, and furthermore, a reserved portion of bandwidth 940 is now visible. This reserved portion may be used for the transmission of asynchronous data or otherwise filled with null packets.

It will be noted that in certain embodiments described above the allocation of bandwidth is carried out without any regard to the reassignment of economised bandwidth to the video encoding of the stream with respect to which the economy was made or of reserving bandwidth for a particular channel for the purposes of transmitting asynchronous data and the like. These considerations may be handled entirely by the channel encoder, which may adjust its bandwidth request with regard to these objectives and submit its bandwidth request in a manner that is entirely transparent to the allocator. The channel encoder may also then handle the channel level assignment of allocated bandwidth to video encoding or other functions, again in a manner transparent to the allocator. Accordingly, these embodiments are compatible with existing video distribution systems and can be implemented by suitable configuration, programming, or modification of the channel encoder alone.

In accordance with certain embodiments, a video encoder unit receives a video signal to encode along with auxiliary services such as audio streams and/or data streams. While the auxiliary streams are allotted a fixed bandwidth, the video encoder determines a required video bandwidth, which must be allocated in response to the request by a central allocator. Where economies are made in the auxiliary services for example by transmitting stereo audio instead of surround sound, the bandwidth requested from the central allocator is inflated by an amount corresponding to a proportion of the economised bandwidth. The extra bandwidth allocated on this basis may then be used for improving the quality of video encoding, and/or reserved for the transmission of asynchronous data.

Other implementation details and variants of these approaches discussed herein may be envisaged, in particular corresponding to the variants of the apparatus described with reference to the preceding drawings. The disclosed techniques can take form of an entirely hardware embodiment (e.g. FPGA), an entirely software embodiment (for example to control a system according to the invention) or an embodiment containing both hardware and software elements. Software embodiments include but are not limited to firmware, resident software, and microcode. Embodiments of the invention can take the form of a computer program product accessible from a computer-usable or computer-readable medium providing program code for use by or in connection with a computer or an instruction execution system. A computer-usable or computer-readable apparatus can be any apparatus that can contain, store, communicate, propagate, or transport the program for use by or in connection with the instruction execution system, apparatus, or device. The non-transitory medium can be an electronic, magnetic, optical, electromagnetic, infrared, or semiconductor system (or apparatus or device) or a propagation medium.

The techniques discussed herein may be implemented by means of computer-application programs or services, an application-programming interface (API), a library, and/or other computer-program product, or any combination of such entities.

Figure 10:
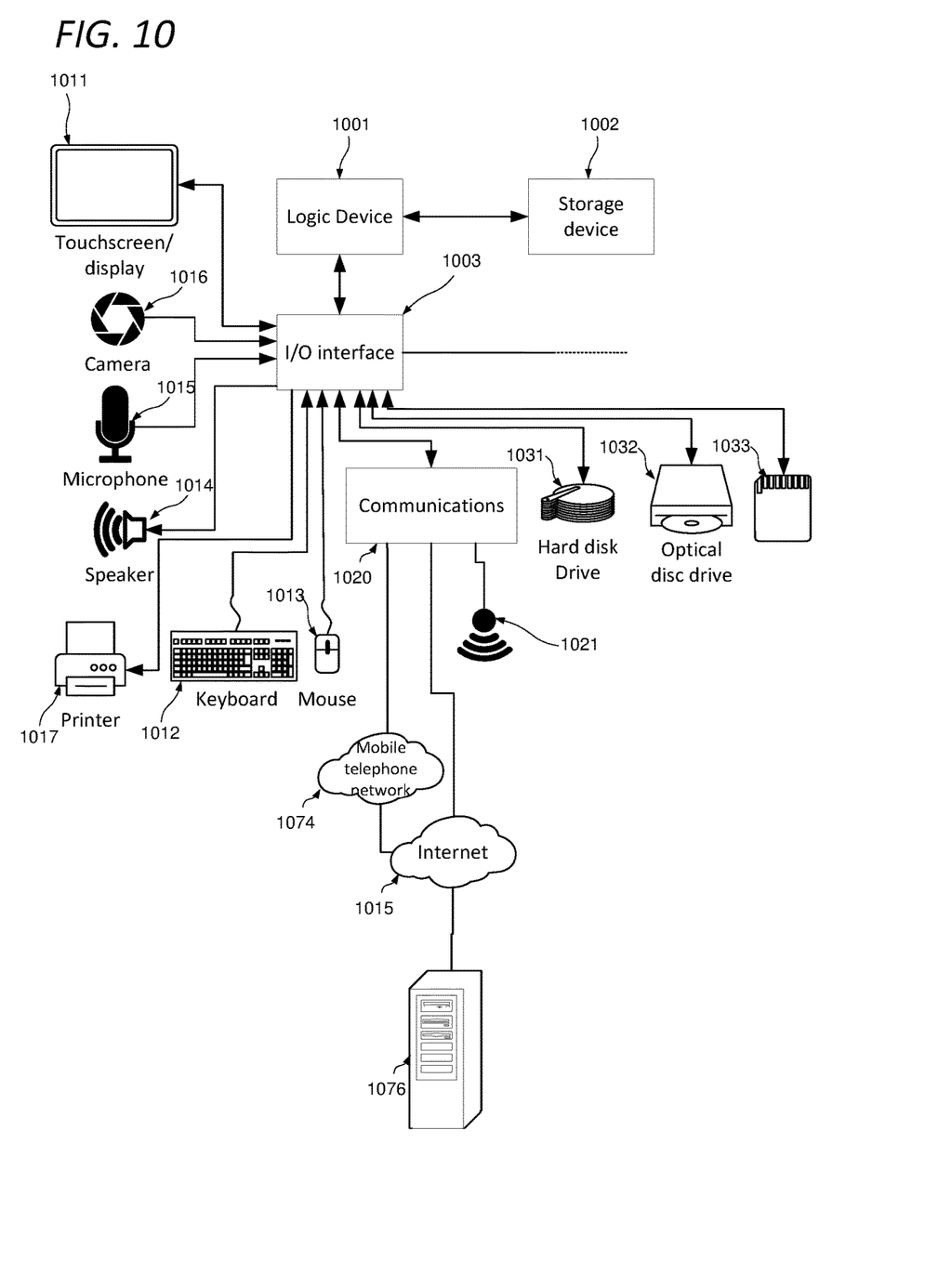
FIG. 10 is a block diagram of a generic computing system suitable for implementation of embodiments of the invention.

FIG. 10 shows a generic computing system suitable for implementation of embodiments of the invention. As shown in FIG. 10, a system includes a logic device 1001 and a storage device 1002. The system may optionally include a display subsystem 1011, input subsystem 1003, communication subsystem 1020, and/or other components not shown. Logic device 1001 includes one or more physical devices configured to execute instructions. For example, the logic device 1001 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 1001 may include one or more processors configured to execute software instructions. Additionally, or alternatively, the logic device 1001 may include one or more hardware or firmware logic devices configured to execute hardware or firmware instructions. Processors of the logic device 1001 may be single-core or multi-core, and the instructions executed thereon may be configured for sequential, parallel, and/or distributed processing. Individual components of the logic device 1001 optionally may be distributed among two or more separate devices, which may be remotely located and/or configured for coordinated processing. Aspects of the logic device 1001 may be virtualized and executed by remotely accessible, networked computing devices configured in a cloud-computing configuration.

Storage device 1002 includes one or more physical devices configured to hold instructions executable by the logic device to implement the methods and processes described herein. When such instructions are stored in a non-transitory manner, the state of storage 1002 device may be transformed—e.g., to hold different data.

Storage device 1002 may include removable and/or built-in devices. Storage device 1002 may comprise one or more types of storage device including optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 1002 may include non-volatile, dynamic, static, read/write, read-only, random-access, sequential-access, location-addressable, file-addressable, and/or content-addressable devices.

In certain arrangements, the system may comprise an I/O interface 1003 adapted to support communications between the logic device 1001 and further system components. For example, additional system components may comprise removable and/or built-in extended storage devices. Extended storage devices may comprise one or more types of storage device including optical memory 1032 (e.g., CD, DVD, HD-DVD, Blu-Ray Disc, etc.), semiconductor memory 1033 (e.g., RAM, EPROM, EEPROM, FLASH etc.), and/or magnetic memory 1031 (e.g., hard-disk drive, floppy-disk drive, tape drive, MRAM, etc.), among others. Such extended storage devices may include volatile, non-volatile, dynamic, static, read/write, read-only, random-access, sequential-access, location-addressable, file-addressable, and/or content-addressable devices.

Aspects of logic device 1001 and storage device 1002 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, and the like. Likewise, the same program may be instantiated by different applications, services, code blocks, objects, routines, APIs, functions, etc. The term "program" may encompass individual or groups of executable files, data files, libraries, drivers, scripts, database records, and the like.

The system of FIG. 10 may be used to implement embodiments of the invention. For example, a program implementing the steps described with respect to FIG. 6 may be stored in storage device 1002 and executed by logic device 1001. The communications interface 1020 may receive the first and/or second video streams, which may be buffered in the storage device 1002. The logic device 1001 may emulate the header processor, timing mapper, block based encoder, auxiliary decoder or auxiliary encoder functions as described above under the control of a suitable program, or may interface with internal or external dedicated systems adapted to perform some or all of these processes such as hardware accelerated encoders/decoders and the like. These tasks may be shared among a number of computing devices, each of which may be a device as described with reference to FIG. 10. The encoded video signal may then be output via the communications interface 1020 for transmission. Accordingly, embodiments of the invention may be embodied in the form of a computer program.

When included, display subsystem 1011 may be used to present a visual representation of the video stream or may otherwise present statistical information concerning the processes undertaken. As the techniques described herein change the data held by the storage device 1002, and thus transform the state of the storage device 1002, the state of display subsystem 1011 may likewise be transformed to visually represent changes in the underlying data. Display subsystem 1011 may include one or more display devices utilizing virtually any type of technology. Such display devices may be combined with logic device and/or storage device in a shared enclosure or such display devices may be peripheral display devices. When included, input subsystem may comprise or interface with one or more user-input devices such as a keyboard 1012, mouse 1013, touch screen 1011, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1020 may be configured to communicatively couple computing system with one or more other computing devices. For example, communication module of may communicatively couple computing device to remote service hosted for example on a remote server 1076 via a network of any size including for example a personal area network, local area network, wide area network, or the internet. Communication subsystem may include wired and/or wireless communication devices compatible with one or more different communication protocols. As non-limiting examples, the communication subsystem may be configured for communication via a wireless telephone network 1074 or a wired or wireless local- or wide-area network. In some embodiments, the communication subsystem may allow computing system to send and/or receive messages to and/or from other devices via a network such as the Internet 1015. The communications subsystem may additionally support short range inductive communications 1021 with passive devices (NFC or RFID for example).

Figure 11:
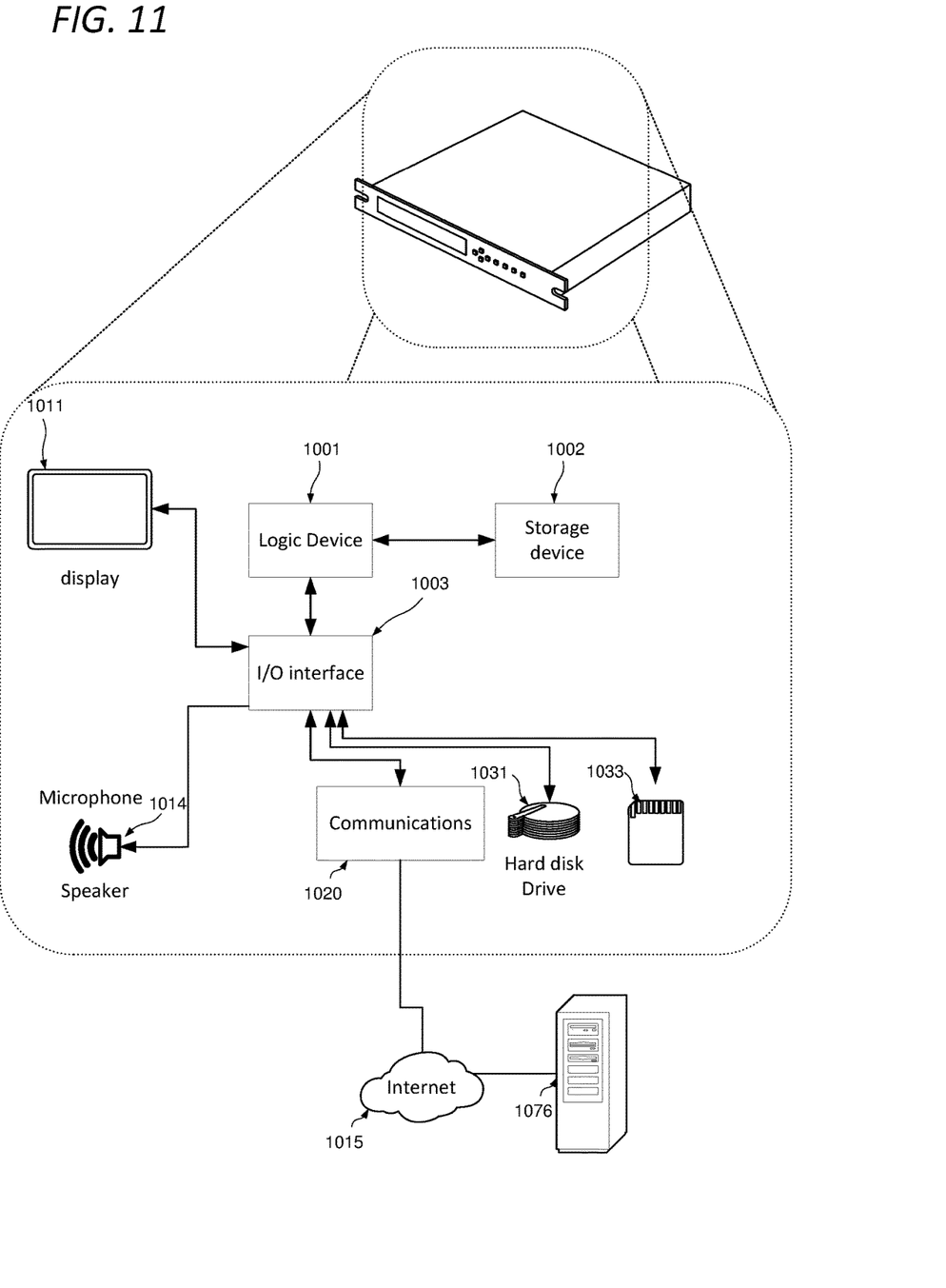
FIG. 11 is an illustration of an encoder unit adaptable to constitute an embodiment of the invention.

FIG. 11 shows an encoder unit adaptable to constitute an embodiment of the invention. As shown in FIG. 11, the encoder unit incorporates elements 1001, 1002, 1003, 1020, 1031 and 1033 as described above. The encoder may receive input streams from a demultiplexer (not shown), Storage Area Network, live video or other source, or may retrieve it from its own storage 1002, 1031, 1033. The device may output encoded streams to a separate channel multiplexer (not shown) or may implement the multiplexing function internally. The device may output encoded streams to a separate head end multiplexer (not shown) or may implement the multiplexing function internally.

The encoder unit is also in communication with a server 1076 via the network 1015. This connection may be by Ethernet, WLAN ("Wi-Fi") and the like. The video stream and/or auxiliary streams may be received via this channel. The encoder unit may be adapted to receive data from other sources (satellite antenna, cable network, etc.).

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. The subject matter of the present disclosure includes all novel and non-obvious combinations and sub-combinations of the various processes, systems and configurations, and other features, functions, acts, and/or properties disclosed herein, as well as any and all equivalents thereof.

What is claimed is:

1. A method of processing video data, comprising:
    receiving said video data;
    determining a required bandwidth for transmitting said video data in accordance with predetermined encoding parameters;

receiving an auxiliary input stream comprising auxiliary data associated with said video data;

determining a required bandwidth for transmitting said auxiliary data in accordance with predetermined encoding parameters;

determining a difference between a predetermined bandwidth allocation for transmission of auxiliary data and said required bandwidth for transmitting said auxiliary data;

requesting said required video bandwidth plus an additional amount of bandwidth, wherein said additional amount of bandwidth is equal to said predetermined bandwidth allocation for said auxiliary data minus a first predetermined proportion of said difference value; and using said additional amount of bandwidth by one or more of: (a) using said additional amount of bandwidth as part of a total amount of bandwidth used to encode said video signal and (b) using said additional amount of bandwidth to transmit asynchronous data on a single output stream carrying said video data and said auxiliary data.

2. The method of claim 1, wherein said auxiliary input stream comprises an audio stream or a data stream.

3. The method of claim 1, wherein using said additional amount of bandwidth as part of said total amount of bandwidth used to encode said video signal comprises:

encoding said video signal such that the bandwidth of the encoded video signal is greater that said required video bandwidth by an amount equal to a second predetermined proportion of said difference, where said second predetermined proportion is less than or equal to the remainder of the said difference minus the first predetermined proportion.

4. The method of claim 1, further comprising:

multiplexing the encoded video stream and an encoded auxiliary stream into said single output stream.

5. The method of claim 4, wherein using said additional amount of bandwidth to transmit asynchronous data on said single output stream comprises:

adding said asynchronous data to said single output stream, wherein the bandwidth of said asynchronous data is controlled so as to not exceed the remainder of said difference less said first predetermined proportion and a second predetermined proportion that is less than or equal to the remainder of the said difference minus the first predetermined proportion.

6. The method of claim 1, further comprising:

receiving a plurality of respective encoder bandwidth requests and assigning bandwidth in response to each video channel, wherein a portion of bandwidth assigned to a particular video channel includes bandwidth previously allocated to said auxiliary input stream.

7. A non-transitory computer-readable storage medium storing one or more sequences of instructions for processing video data, which when executed, cause:

receiving said video data;

determining a required bandwidth for transmitting said video data in accordance with predetermined encoding parameters;

receiving an auxiliary input stream comprising auxiliary data associated with said video data;

determining a required bandwidth for transmitting said auxiliary data in accordance with predetermined encoding parameters;

determining a difference between a predetermined bandwidth allocation for transmission of auxiliary data and said required bandwidth for transmitting said auxiliary data;

requesting said required video bandwidth plus an additional amount of bandwidth, wherein said additional amount of bandwidth is equal to said predetermined bandwidth allocation for said auxiliary data minus a first predetermined proportion of said difference value; and using said additional amount of bandwidth by one or more of: (a) using said additional amount of bandwidth as part of a total amount of bandwidth used to encode said video signal and (b) using said additional amount of bandwidth to transmit asynchronous data on a single output stream carrying said video data and said auxiliary data.

8. The non-transitory computer-readable storage medium of claim 7, wherein said auxiliary input stream comprises an audio stream or a data stream.

9. The non-transitory computer-readable storage medium of claim 7, wherein using said additional amount of bandwidth as part of said total amount of bandwidth used to encode said video signal comprises:

encoding said video signal such that the bandwidth of the encoded video signal is greater that said required video bandwidth by an amount equal to a second predetermined proportion of said difference, where said second predetermined proportion is less than or equal to the remainder of the said difference minus the first predetermined proportion.

10. The non-transitory computer-readable storage medium of claim 7, wherein execution of the one or more sequences of instructions further cause:

multiplexing the encoded video stream and an encoded auxiliary stream into said single output stream.

11. The non-transitory computer-readable storage medium of claim 10, wherein using said additional amount of bandwidth to transmit asynchronous data on said single output stream comprises:

adding said asynchronous data to said singe output stream, wherein the bandwidth of said asynchronous data is controlled so as to not exceed the remainder of said difference less said first predetermined proportion and a second predetermined proportion that is less than or equal to the remainder of the said difference minus the first predetermined proportion.

12. The non-transitory computer-readable storage medium of claim 7, wherein execution of the one or more sequences of instructions further cause:

receiving a plurality of respective encoder bandwidth requests and assigning bandwidth in response to each video channel, wherein a portion of bandwidth assigned to a particular video channel includes bandwidth previously allocated to said auxiliary input stream.

13. A bandwidth request unit for a digital television headend encoder unit, comprising:

one or more processors; and one or more non-transitory computer-readable storage mediums storing one or more sequences of instructions, which when executed, cause:

allocating bandwidth to an encoder on the basis of a dynamic attribution for video data and a predetermined value for auxiliary data by:

receiving said video data;

determining a required bandwidth for transmitting said video data in accordance with predetermined encoding parameters;

receiving an auxiliary input stream comprising auxiliary data associated with said video data;

determining a required bandwidth for transmitting said auxiliary data in accordance with predetermined encoding parameters;

determining a difference between a predetermined bandwidth allocation for transmission of auxiliary data and said required bandwidth for transmitting said auxiliary data;

requesting, to said encoder, said required video bandwidth plus an additional amount of bandwidth, wherein said additional amount of bandwidth is equal to said predetermined bandwidth allocation for said auxiliary data minus a first predetermined proportion of said difference value; and using said additional amount of bandwidth by one or more of: (a) using said additional amount of bandwidth as part of a total amount of bandwidth used to encode said video signal and (b) using said additional amount of bandwidth to transmit asynchronous data on a single output stream carrying said video data and said auxiliary data.

14. The bandwidth request unit of claim 13, wherein said auxiliary input stream comprises an audio stream or a data stream.

15. The bandwidth request unit of claim 13, wherein using said additional amount of bandwidth as part of said total amount of bandwidth used to encode said video signal comprises:

encoding said video signal such that the bandwidth of the encoded video signal is greater that said required video bandwidth by an amount equal to a second predetermined proportion of said difference, where said second predetermined proportion is less than or equal to the remainder of the said difference minus the first predetermined proportion.

16. The bandwidth request unit of claim 13, wherein execution of the one or more sequences of instructions further cause:

multiplexing the encoded video stream and an encoded auxiliary stream into said single output stream.

17. The bandwidth request unit of claim 16, wherein using said additional amount of bandwidth to transmit asynchronous data on said single output stream comprises:

adding said asynchronous data to said single output stream, wherein the bandwidth of said asynchronous data is controlled so as to not exceed the remainder of said difference less said first predetermined proportion and a second predetermined proportion that is less than or equal to the remainder of the said difference minus the first predetermined proportion.

18. The bandwidth request unit of claim 13, wherein execution of the one or more sequences of instructions further cause:

receiving a plurality of respective encoder bandwidth requests and assigning bandwidth in response to each video channel, wherein a portion of bandwidth assigned to a particular video channel includes bandwidth previously allocated to said auxiliary input stream.

* * * * *